Nov. 10, 1959
P. E. DORNEY ET AL
2,912,652
MICROWAVE SWEEP GENERATORS
Filed Feb. 7, 1955
4 Sheets-Sheet 1
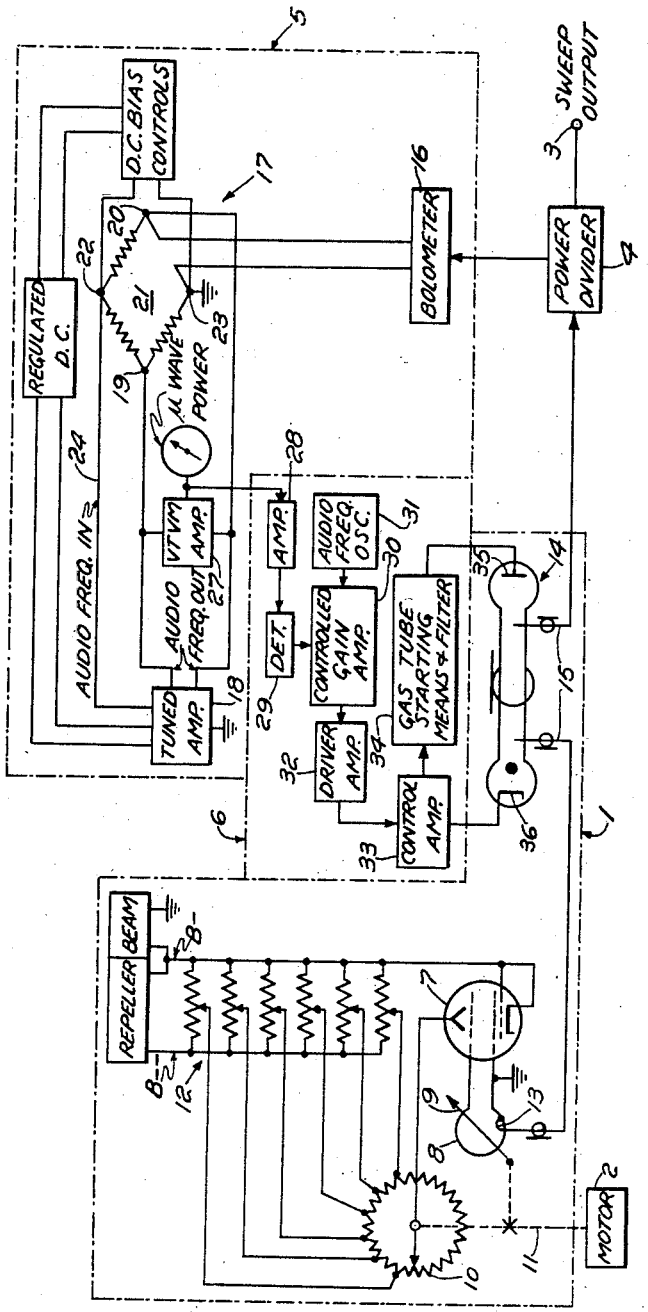
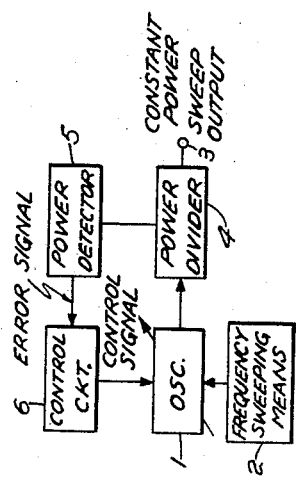
INVENTORS
PATRICK E. DORNEY
DOUGLAS M. SHARP
BY
*Percy P. Lantry*
ATTORNEY

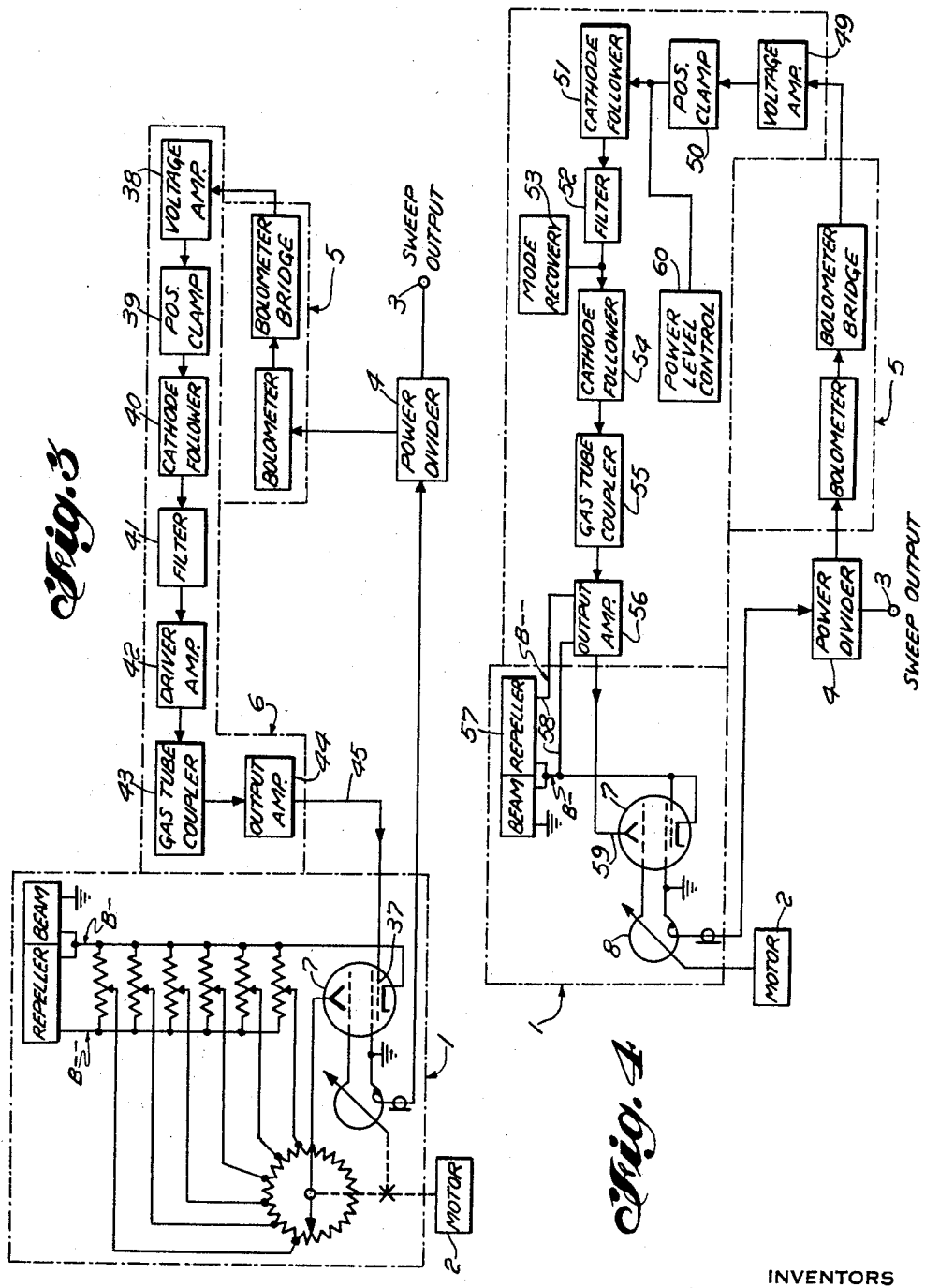

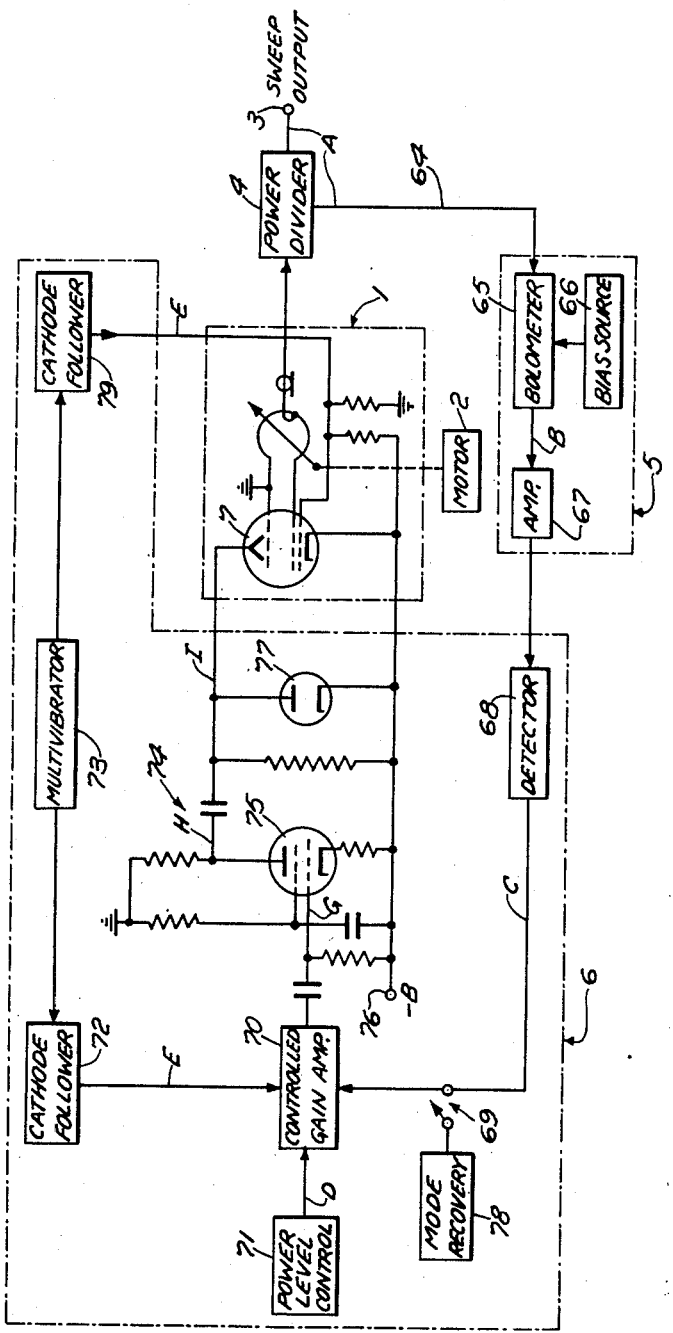

Fig. 7
CURVE A
UNCORRECTED
OUTPUT
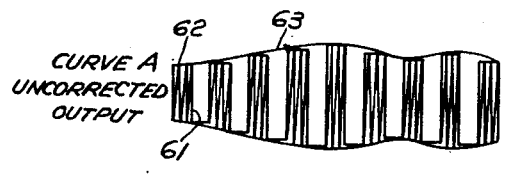
CURVE F
COMBINATION
CURVES
C & D
INPUT
TO AMP. 70
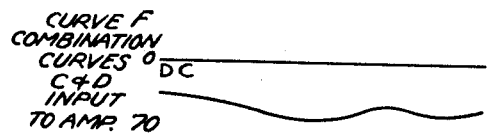
CURVE B
BOLOMETER
OUTPUT
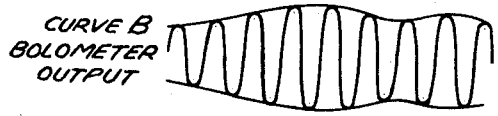
CURVE G
GRID
TUBE 75
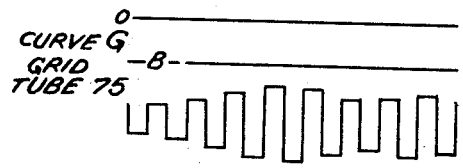
CURVE C
DETECTOR
OUTPUT
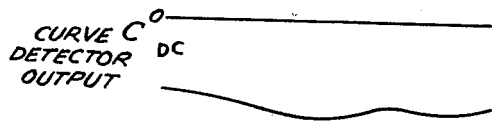
CURVE H
ANODE
TUBE 75
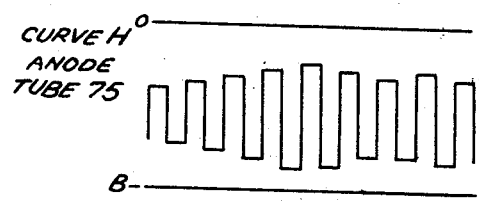
CURVE D
POWER
LEVEL
CONTROL
OUTPUT
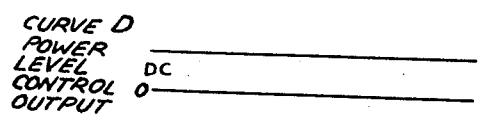
CURVE I
CLAMPED
OUTPUT
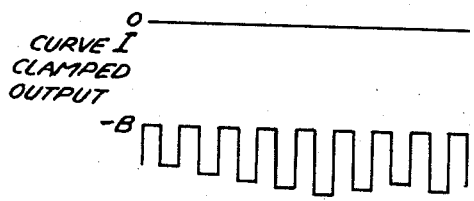
CURVE E
MOD.
OUTPUT
INVENTORS
PATRICK E. DORNEY
DOUGLAS M. SHARP
BY
ATTORNEY United States Patent Office 2,912,652
Patented Nov. 10, 1959

2,912,652

MICROWAVE SWEEP GENERATORS

Patrick E. Dorney, Emerson, and Douglas M. Sharp, Allendale, N.J., assignors to International Telephone and Telegraph Corporation, Nutley, N.J., a corporation of Maryland Application February 7, 1955, Serial No. 486,582

17 Claims. (Cl. 331—84)

This invention relates to sweep generators and more particularly to sweep frequency generators operating in the kilomegacycle frequency region delivering a sweep frequency signal output having a wide sweep frequency range with a constant power level throughout the entire sweep frequency range.

Sweep frequency generators have found importance in electrical circuit measurements since a continuous indication of the equipment under measurement is provided. The time saved in adjusting an electrical circuit for optimum results when employing sweep frequency generators is rather large when compared to a point-by-point measuring technique. For example, the adjustment of the impedance match between a transmission line and a traveling wave electron discharge device which has a wide band frequency response between 2,000 megacycles and 4,000 megacycles is made much easier and the time consumed much less when a sweep frequency measuring technique is employed rather than a point-by-point measuring technique. As the frequency sweep range and frequency of operation increases to kilomegacycle region, the problems of obtaining a wide frequency sweep with constant power output throughout the sweep range increases.

Heretofore, reflex klystron oscillators have been employed to generate the desired broadband sweep frequency signals by mechanically sweeping the cavity resonator of the klystron oscillator and mechanically tracking the repeller voltage of the klystron oscillator with the change in cavity resonator resonant frequency. This mechanical tracking is accomplished by means of a potentiometer which is connected mechanically to the cavity tuning device. Employment of the above mechanical arrangement to provide a sweep frequency signal with a constant power level throughout a wide frequency sweep range requires that the dimensions of the cavity be precisely manufactured, the tuning element of the cavity must be precisely related to the cavity and the mechanical linkage between the cavity tuning element and the electrically precise reflector potentiometer must be precisely manufactured and precisely interrelated with the mechanical drive. This necessity of mechanical and electrical precision adds to the cost of the frequency generator and substantially removes the manufacture thereof from the facilities of a production line.

Therefore, it is an object of this invention to provide a wide band sweep frequency generator for kilomegacycle operation having substantially constant power output over the sweep frequency range which substantially reduces the necessity of precision manufacturing.

Another object of this invention is to provide in conjunction with a swept frequency oscillator an electronic circuit responsive to power level variations in the output signal of the oscillator to produce a signal proportional to these power level variations for electronic control of the oscillator in a manner to maintain the output signal therefrom at a substantially constant power level throughout a wide band sweep frequency range.

There is disclosed herein certain embodiments of this invention that employ as the source of oscillations a klystron type oscillator, such as the 6BL6, which is commercially available. The frequency of the output signal of the klystron is swept through a given frequency range by a mechanically driven plunger which tunes the cavity resonator associated with the klystron. Interconnected with the mechanically driven tuning plunger is a potentiometer arrangement which causes an adjustment of the repeller voltage of the klystron to establish a desired tracking between the repeller voltage and the cavity tuning. The mechanical tracking and tuning is not necessarily of an extremely precise nature since the electronic control circuit of this invention is utilized to electronically control the oscillator to compensate for any power level variations in the output signal that may be contributed by a non-critical tracking arrangement as well as heretofore observed power level variations in the more precise and elaborate sweep frequency generators.

A feature of this invention is the provision in combination with a swept frequency oscillator incorporating mechanical tuning and repeller voltage tracking of an electronic circuit including a power detector to produce an error signal proportional to the power level variations in the output of the oscillator and a control circuit responsive to the error signal to produce a control signal.

Another feature of this invention is the provision of a means to couple the above produced control signal to various electrodes of or circuit elements related to the oscillator to maintain the output signal at a substantially constant power level throughout the relatively wide sweep frequency range. For instance, the control signal may be coupled to the control electrode of the oscillator tube, or an attenuating device, whose attenuating characteristic is controlled by the control signal, coupled in the output circuit of the oscillator.

Still another feature of this invention is the provision in combination with a swept frequency oscillator incorporating mechanical tuning of an electronic circuit, including a power detector and a control circuit, coupled between the output of the oscillator and the repeller electrode thereof to simultaneously electronically track the repeller voltage with the mechanical tuning and control the operation of the oscillator to compensate for any power level variation detected in the output signal of the oscillator.

A further feature of this invention is the provision in combination with a swept frequency oscillator incorporating mechanical tuning of a control circuit coupled between the output of the oscillator and the repeller electrode thereof to simultaneously modulate the output of the oscillator, produce the necessary repeller electrode voltage, electronically track the produced repeller voltage with the mechanical tuning of the oscillator, and control the operation of the oscillator to compensate for any power level variations detected in the output of the oscillator.

The above-mentioned and other features and objects of this invention will become more apparent by reference to the following description taken in conjunction with the accompanying drawings, in which:

Fig. 1 illustrates a block diagram of the basic components comprising a sweep frequency generator in accordance with the principles of this invention;

Figs. 2, 3 and 4 illustrate block diagrams of several embodiments of this invention;

Fig. 5 illustrates a typical klystron mode plot of output power vs. repeller voltage useful in describing the operation of the embodiment shown in Fig. 4;

Fig. 6 illustrates a block diagram of still another embodiment of this invention; and Fig. 7 illustrates the various waveforms, exaggerated in amplitude variation, occurring at indicated points in the circuit of Fig. 6 useful in describing the operation of this embodiment.

Referring to Fig. 1, there is disclosed in block diagram form the basic components of the microwave sweep frequency generator of this invention which produces an output signal having a wide sweep frequency range in the kilomegacycle frequency region with a substantially constant power output at all frequencies in the sweep frequency range. An oscillator 1 functions as the source of frequency signals. The description hereinbelow is made relative to the utilization of a klystron type oscillator, but is not necessarily limited thereto. The frequency output of oscillator 1 is swept over a desired frequency range of at least 2 to 1 by a frequency sweeping means 2, such as a motor, to change the position of a plunger type tuning element of a resonant cavity associated with oscillator 1 at a specified rate. The useful sweep frequency range of the specific sweep generators disclosed herein is limited only by the sweep frequency source employed and the principle of obtaining constant power level output is adaptable to all frequency ranges for which suitable sweep frequency sources are available.

The swept frequency output signal of oscillator 1 is coupled to the output terminal 3 by means of a power divider 4 which provides a selected amount of output power for monitoring purposes. This small amount of output power is coupled to power detector 5 which produces an error signal indicative of the power level variations in the output signal. There is further provided a control circuit 6 responsive to the error signal to produce a control signal having a characteristic sufficient to control the operation of oscillator 1 in a manner to compensate for power level variations in its output signal and thus maintain a substantially constant power level as the frequency of the output signal of oscillator 1 is swept through the sweep frequency range. The characteristic of the control signal depends upon whether it is coupled to an electrode of oscillator 1 or to an attenuation device disposed in the output circuit of oscillator 1. In certain instances, the control signal will have a complex characteristic which will enable the achievement of electronic tracking of the repeller voltage with the mechanical sweeping arrangement and simultaneously will control oscillator 1 to provide a substantially flat output power over the sweep frequency range.

Referring to Fig. 2, a specific embodiment following the principles of this invention is illustrated in block form. Oscillator 1 is shown schematically to comprise a klystron electron discharge device 7 mounted in a coaxial, external cavity 8. The frequency of the electron discharge device is swept by mechanically driving the cavity shorting plunger 9 with frequency sweeping means 2 illustrated as a motor. A linear potentiometer 10 is mechanically ganged, as indicated at 11, with the sweeping means 2 so that the repeller voltage will track the frequency tuning or sweeping. Trimmer potentiometers 12 are included in the mechanical tracking arrangement to aid in holding the repeller voltage as close to an optimum value at all frequencies as is possible.

The output circuit of cavity 8 includes coupling loop 13 which is inter-connected with a signal attenuating device 14 illustrated schematically as a gas discharge device mounted in series with the center conductor of a coaxial line 15. The amount of power transmitted through the gaseous attenuator tube is proportional to the discharge current within the tube. The output signal of oscillator 1 is coupled via coaxial line 15 to the power divider 4 wherein a specific amount of signal is coupled to power detector 5 to initiate the operation of the power level control circuit of this invention.

Power detector 5 includes a broadband coaxial bolometer 16 as a power monitor connected in a bridge circuit 17. The bridge circuit 17, for instance, a PRD type 650 Universal Power Bridge, includes a tuned audio frequency amplifier 18 tuned for instance to 10 kc. The output of amplifier 18 is applied to terminals 19 and 20 of bridge 21. The resulting voltage developed across terminals 22 and 23 of bridge 21 is fed back to the input of the tuned amplifier 18 by conductor means 24 in proper phase to produce oscillations. The audio frequency power thus generated then changes the bolometer resistance and brings the bridge 21 into near balance. The amplifier 18 reaches a stable operating condition when the amplified input voltage just equals the output voltage. The greater the gain of the amplifier, the more closely is the bridge balanced. If additional power is applied to the bridge 21 in the form of D.C. or R.F. power, then the audio frequency power supplied by the amplifier must decrease by exactly the same amount to restore the bridge to its original balanced condition. This decrease in audio frequency power across bridge 21 is measured by the vacuum tube volt meter 25 which is calibrated in milliwatts. The regulated D.C. supply 26 and D.C. bias control 27 cooperate in providing appropriate bias potentials for bridge 21, bolometer element 16 and zero set potential for the vacuum tube volt meter 25.

In the feedback type microwave sweep generator of this invention, a power bridge circuit as described hereinabove provides a convenient method of sampling output power and detecting variations in the ouput power level. Since the output signal of oscillator 1 is CW, a conventional detector would have to be followed by either a mechanical chopper and A.C. amplifier or critical D.C. amplifier to bring the sampled signal up to a usable level. The bridge circuit 17, with its audio frequency output, provides an easily amplified carrier wave which carries in its envelope all the slowly changing power amplitude information originally generated in oscillator 1.

For utilization in the sweep generator in accordance with this invention, an output lead 26 is taken from the vaccum type volt meter amplifier 27 and applied to the input of an amplifier 28 which forms the input of the control circuit 6. Amplifier 28 amplifies the audio frequency signal from the power detector 5 to a signal level sufficient for detection thereof. The output of amplifier 28, an amplitude modulated carrier wave, is demodulated in detector 29. The output signal of detector 29 is a D.C. voltage whose amplitude changes inversely with the amplitude of the microwave output signal. The output of detector 29 is applied to the controlled gain amplifier 30 and acts as a varying negative bias voltage for that stage.

The amplifier 30 has coupled thereto a constant amplitude input signal supplied by a stable audio frequency oscillator 31 operating at an audio frequency of 5 kc., for example. The audio frequency output of amplifier 30 varies in amplitude as a function of the gain of the amplifier which is changed in accordance with the D.C. voltage output of detector 29. Therefore, an increase in microwave power causes a decrease in negative bias voltage on amplifier 30, an increase in gain thereof and, consequently, an increase in signal amplitude at the output of controlled gain amplifier 30. A bias adjustment may be provided in amplifier 30 to set the operating level desired.

The output of amplifier 30 is coupled to driver amplifier 32 whose amplitude is increased by the operation thereof to a point sufficient for driving or pulsing the control amplifier 33. The control amplifier may be comprised, for example, of three triode connected beam power pentodes in parallel. There is no fixed or resistor bias associated with these parallel connected electron discharge devices so that maximum current flows with no signal input. When a signal is applied to the input of amplifier 33, that is, at the grid circuit thereof, grid clamping takes place and substantially the entire input signal swings negative with respect to ground, thus reducing anode current in the control amplifier 33.

The output of control amplifier 33 is coupled to a gas tube starting means and signal filter 34 which functions to cause a discharge to exist in gas attenuator 14 between the anode 35 and cathode 36 thereof. The filter component of circuit means 34 is a high inductance which provides two important functions. Its inductance is too high to follow the audio frequency rate at which the output signal of amplifier 33 swings and, therefore, averages or filters. Also, as a high inductance with a manually operated shorting switch across it, this inductance provides an excellent transient voltage peak for starting the gas tube. As mentioned before, the gas attenuator 14 is a coaxial microwave component which allows maximum transmission of microwave power when maximum D.C. current is flowing. Therefore, when the gas tube is connected in series with amplifier 33 and the filter component of circuit 34, the microwave transmission will be greatest when the input signal to the control amplifier 33 is of low amplitude.

This completes the feedback loop or circuit of this embodiment in which the bolometer 16 samples the signal and the gas tube attenuator 14 in the output circuit of klystron 7 acts upon the output signal. If the klystron power raises, the gas tube transmission decreases, or if the klystron power decreases, transmission through the gas attenuating tube is increased. The gain of the control system is such that the power output is constant to within less than a tenth of a db over the sweep frequency range.

Referring now to Fig. 3, there is disclosed another embodiment following the principles of this invention as outlined with respect to Fig. 1. The microwave sweep generator of this embodiment employs an oscillator 1 incorporating mechanical tuning and a repeller voltage tracking as described in connection with Fig. 2 with the exception that the output circuit of klystron 7 does not include therein the gas attenuating device 14. The power divider 4 and the power detector 5 are identical in circuit components and operation as they were in the embodiment of Fig. 2. The sweep generator otherwise is similar only in that it makes use of negative feedback principles. The control element within oscillator 1 is the control electrode 37 of klystron 7 rather than the gas attenuating tube of Fig. 1, thereby necessitating a control circuit 6 which is considerably different from the control circuit 6 of Fig. 2.

In describing the operation of control circuit 6, it is convenient to consider the audio frequency signal output of power detector 5 as a carrier wave with the microwave power fluctuations modulating it. This carrier wave is coupled to amplifier 38 for signal amplification thereof, the output of which is coupled into a positive clamping diode 39. Clamp 39 functions to reference the carrier wave or signal at a point which is negative with respect to the cathode potential of the following stage in a manner such that the carrier wave can swing only in a positive direction from this point. The negative voltage for clamp 39 may be supplied by an adjustable fixed bias supplied by a battery to provide a no-signal cut-off condition for the following stage. As will be observed, the following stage is a cathode follower 40 which provides output voltage only when an input signal of sufficient amplitude is present to overcome the negative bias of clamp circuit 39. Because of the positive clamping diode, the entire signal input acts in a positive direction, and because of the high negative bias, even a small modulation on the carrier causes a large change in cathode follower output. Effectively, this cathode follower 40 clips all but the signal information desired.

The output of cathode follower 40 is filtered in filter 41 to provide a D.C. signal which is coupled to the driver amplifier 42. Very little gain is realized in this stage since it becomes necessary at this point to transfer the D.C. signal to the grid of the output amplifier 44 which operates at a voltage highly negative with respect to ground. Gas tube coupler 43 is employed which effectively shunts amplifier 42 with a relatively low impedance thus reducing the gain of this stage. The output of gas tube coupler 43 is coupled to the output amplifier 44 which may be a high voltage high mu triode functioning to recover some of the gain lost in amplifier 42. The output of amplifier 44 is of sufficient amplitude and polarity to be applied to the klystron control electrode 37 by means of conductor 45.

The operation of this control system can be understood more clearly by using a specific correction example. If the microwave output power to terminal 3 tends to increase, the audio frequency signal at the output of detector 5 will decrease a proportional amount. This reduction in amplitude is seen at the cathode follower 40 input as a reduction in positive going signal and results in a decrease in anode current. The anode current decrease causes a reduction in output from cathode follower 40 and hence a negative going D.C. signal at the input of amplifier 42. This results in a positive going D.C. signal at the output of amplifier 42 which is transferred through the gas tube coupler 43 as a positive going D.C. signal in the grid circuit of amplifier 44. The signal direction is reversed again in the anode circuit of amplifier 44 so that a negative going signal appears at electrode 37 of klystron 7. This direction of signal is the desired direction since as the control electrode 37 goes negative, the microwave power output is reduced, tending to correct the original rise in output power. The gain of the circuit has been demonstrated in a successful reduction to practice to be sufficient to keep the output power level constant to within a tenth of a db. A predetermined power level can be selected by appropriately adjusting the bias on the cathode follower 40.

The embodiments of Figs. 2 and 3 employ mechanical tracking of the repeller voltage to maintain the operation of the klystron at an optimum value. The embodiment of Fig. 4 incorporates a control circuit for simultaneous electronic repeller voltage tracking and control of the oscillator for constant power output.

To aid in the understanding of the operation of the system of Fig. 4, reference will be had to a typical klystron mode plot 46 of an output power vs. a repeller voltage as depicted in Fig. 5. As the repeller voltage increases from zero in a negative direction, there is an interval of no power output. Then at some particular repeller voltage, output power is attained and this power increases as the repeller voltage is increased in a negative direction until a maximum power level is reached. Further increasing of the repeller voltage in the negative direction causes a decrease of the power output at substantially the same rate as the power level increased on the leading edge of the mode. If the repeller voltage is increased to a point beyond the mode, the microwave power again becomes zero. Thus, any particular power level less than the maximum available can be obtained by adjusting the repeller voltage. Therefore, a negative feedback circuit operating on one side of the mode will stabilize the microwave power output in a manner similar to the negative feedback circuit of the system illustrated in Fig. 3. For example, if the leading edge of the mode is chosen, as is done in the system of Fig. 4, a tendency for the power to rise will be counteracted by a repeller voltage decrease.

The mode plot 46 is, of course, taken at only one microwave frequency. As the frequency is increased, the mode substantially retains its shape; however, the maximum power available varies, and the whole mode will in effect shift along the repeller voltage axis in an increasingly negative direction, as indicated by the dotted mode plots 47 and 48. This condition makes the task of controlling the power output more difficult, but only in the sense that a wider control range is necessary. If a small change in frequency is considered, then only a small mode shift will be encountered. If the frequency goes up and the repeller voltage is held constant, a slight drop in microwave power will be observed because of the mode shift. The feedback circuit including power detector 5 and controlling circuit 6 will correct this power drop by supplying more repeller voltage in the same manner and substantially simultaneously as it would correct a power reduction for any other cause. As the klystron cavity 8 of oscillator 1 is swept by sweeping means 2, this action takes place continuously and, therefore, enables the elimination of the mechanical repeller voltage tracking.

Referring to Fig. 4, it will be observed that the output signal of oscillator 1 is sampled by power divider 4, power level variations of the sampled energy are detected by power detector 5 and supplied to the control circuit 6 in substantially the same manner as disclosed with reference to the systems of Figs. 2 and 3. As before, the bolometer 16 and bolometer bridge 17 provide an audio frequency carrier with the microwave power amplitude information modulating it for amplification in amplifier 49. The amplified amplitude modulated audio frequency carrier is applied to a positive clamping diode 50 and a cathode follower 51 which have the same function and same circuit characteristics as described in connection with the stages 39 and 40 of the control circuit 6 of Fig. 3. The output of cathode follower 51 is filtered in filter 52 and becomes a D.C. signal inversely proportional to the microwave power level. At this point in the circuit, a mode recovery circuit 53 is provided, the operation of which will be discussed hereinbelow.

The output of filter 52 is directly coupled to a second cathode follower 54 which has its load resistor connected to a voltage point extremely negative with respect to ground. The anode of the cathode follower 53 is connected to a voltage point above ground such that the tube actually operates above ground potential. The high negative voltage between the cathode and cathode resistor of cathode follower 54 is absorbed by a series of voltage regulator gas tubes 55 which serves as a D.C. signal coupling path. The cathode load resistor of cathode follower 54 then becomes the grid resistor for the output amplifier 56.

The output amplifier is preferably a high mu triode type D.C. amplifier operating across the repeller power supply 57 via means of conductors 58. This arrangement insures the repeller electrode of always being negative with respect to the klystron cathode. The repeller 59 of klystron 7 is directly coupled to the anode of the output amplifier 56 to complete the feedback circuit.

To start the operation of this system a single control is necessary. This control is located in the grid circuit of the first cathode follower 51 as a fixed bias adjustment and is referred to herein as the power level control 60. When this control is rotated to a maximum negative bias condition, there is no microwave power. Since the audio frequency signal from the voltage amplifier 49 is inversely proportional to the microwave power, this signal is at a maximum. This maximum audio frequency signal amplitude, however, is not sufficient to overcome the maximum negative bias of control 60. Consequently, no anode current flows in the first cathode follower 51. This results in a negative D.C. signal at the grid of the second cathode follower and obviously a negative signal at the grid of the output amplifier 56. This signal, in fact, is negative enough to cut off plate current in the output amplifier which places the repeller at the cathode potential of klystron 7 and thus the klystron delivers no microwave power.

As the power level control 60 is rotated to a less negative grid bias condition, a point is reached where the audio frequency signal causes anode current to start flowing in cathode follower 51. The D.C. signals at the grids of cathode follower 54 and output amplifier 56 swing in a positive direction and the amplifier 56 becomes conductive. A voltage develops across the load resistor of amplifier 56 and the repeller voltage will thereby be caused to increase in a negative direction. This negative increase in repeller voltage is rather rapid as power level control 60 is rotated until the repeller voltage is sufficiently high to operate the klystron 7 in one of its normal modes of operation. At this time, microwave power is generated and thereby causes a reduction in the amplitude of the audio frequency signal at the output of amplifier 49. This has a degenerative effect on the control arrangement since the audio frequency signal in conjunction with the fixed bias of level control 60 is responsible for developing the repeller voltage. Therefore, as the power level control 60 is further rotated, the repeller voltage responds more slowly, and the control effect changes from a coarse repeller control to a fine power level control.

If the first mode of operation encountered delivers an inadequate amount of microwave power, further manipulation of level control 60 will cause the repeller voltage to rise to the peak of this mode and then move to an equal power point on the leading edge of the next mode. Additional power can then be obtained by moving higher on the slope of this mode.

Assuming that the peak is adequate or more than adequate at this point, the sweep mechanism 2 can be turned on. As the frequency is swept, the repeller voltage will swing up and down the side of this mode, keeping the power output constant. The mode shape will remain substantially the same at all microwave frequencies, but the maximum power available at different frequencies varies. If at some frequency the power level setting is too high for the maximum power available, the repeller voltage will rise to the peak of this mode and finding insufficient power, will continue to rise. If there is no higher mode available, the repeller voltage will swing to the limit of the power supply. Normally, it would stay there until the power level control 60 was returned to its maximum negative grid position and then brought back to a point representing somewhat less microwave power. Since this control manipulation would be inconvenient and the loss of power output may be unnecessarily long, a mode recovery circuit 53 is employed.

Mode recovery circuit 53, a sawtooth generator, is inactive during normal operation. It consists substantially of a thyratron connected between the grid of cathode follower 54 and ground potential. A secondary adjustment sets the firing point of the thyratron by varying its grid bias. The firing point of recovery circuit 53 is set so that it will not fire until the grid of cathode follower 54 has gone so positive that it becomes obvious the repeller has overshot all modes, and the system is inoperative. When the thyratron does fire, this positive voltage is reduced to cause the repeller voltage to return to the klystron cathode potential. The thyratron is then extinguished because of this low voltage, and repeller voltage begins to rise. The rate of rise is determined by the time constant of the cathode follower 51 which includes the internal resistance of the electron discharge device therein, its load resistance, and the filter capacitor disposed in parallel with the load resistance. In this system, the rate of rise is rather fast and a typical sawtooth wave is developed with each firing of recovery circuit 53. This wave shape appears at the repeller 59 as a repeller voltage fluctuation and performs a scanning operation. The entire repeller voltage parameters are scanned in an effort to find a mode which will support the setting of power level control 60.

Eventually, the klystron cavity 8 is tuned to a frequency at which a mode with enough power exists to satisfy the requirement of the power level control 60. The operator can then either back down on the power level control 60 and have smooth power control throughout the band of microwave frequencies or operate at the original or higher level with erratic power output at specific frequencies. Under normal operating conditions, however, the power level throughout a wide band of microwave frequencies, for instance, 2,000 megacycles to 4,000 megacycles, can be held to within less than a tenth of a db with very little loss in available power.

The systems of Figs. 2, 3 and 4 provide CW output with no internal means of modulating this output. The system of Fig. 6 operates on substantialy the same principle as the previously described systems but is 100% modulated by an audio frequency square wave. An important advantage of this type of operation is that narrow band audio amplifiers may be utilized in the system for improved measurement sensitively and further, the arrangement of the control circuit 6 is such that the repeller voltage power supply heretofore employed is eliminated. The circuit combinations of control circuit 6 provides a means of maintaining a constant power level output from the klystron 7, sufficient voltage for the repeller electrode of klystron 7 and electronic tracking of the repeller voltage with the tuning of cavity 8.

The description of the circuit of Fig. 6 will be made in conjunction with the curves of Fig. 7 depicting waveforms occurring at indicated points in the circuit of Fig. 6. The output of oscillator 1 is coupled to a power divider 4 to enable the sampling of the output power coupled to terminal 3. Curve A of Fig. 7 indicates the waveform appearing at points A, the output of the power divider 4, to be composed of the modulating audio frequency signal 61, the microwave signal 62 and the power level amplitude variation 63. The sampled signal output is coupled through conductor means 64 to the power detector 5 which includes a bolometer 65 and a bias source 66 to establish the operating condition of the bolometer 65. The characteristic of bolometer 65 is such that the audio frequency modulation is detected along with the amplitude modulated information thereby eliminating the microwave signal component, as indicated in curve B of Fig. 7. It will be observed that the action of the bolometer 65 does not reproduce the square wave modulation component but actually tends to round these square wave components. The waveform B at the output of bolometer 65 has a rather low level which is amplified to an appropriate operating level by amplifier 67 for presentation to detector 68, a portion of control circuit 6.

Detector 68 detects the negative portion of the output of amplifier 67, as indicated in curve C of Fig. 7. Thus, a negative going D.C. voltage is produced which varies proportional to the power level variations in the output signal of oscillator 1. The output of detector 68 is coupled to a controlled gain amplifier 70. Also providing an input to control gain amplifier 70 in the form of a D.C. bias voltage is power level control 71 similar in function and purpose as power level control 60 of Fig. 4. The output of control 71 and detector 68 are combined at the input of controlled gain amplifier 70 in such a manner as to reduce the negative D.C. level, as indicated in curve F, and thereby emphasize the amplitude variations in the output of detector 68.

A third signal input is coupled to amplifier 70 by means of cathode follower 72 from the modulating source 73 which may take the form of a multivibrator generating an audio frequency square wave for modulating the output of oscillator 1. The square wave modulation signal, as indicated in curve E, is of constant amplitude and repetitious at a selected audio frequency which in a reduction to practice was 1 kc. The output of amplifier 70 is coupled to the output amplifier 74 which includes therein an electron discharge device 75. The beam voltage power supply coupled to terminal 76 is utilized as the power necessary for amplification of the output of amplifier 70 by device 75 and its associated circuitry. The waveform presented to the control grid of device 75 is depicted in curve G of Fig. 7. The output at the anode of electron discharge device 75, as depicted in curve H of Fig. 7, is an amplified image of the signal presented to the grid of device 75 and is more positive than the beam voltage at terminal 76. The waveform of curve H is clamped and referenced to the beam voltage potential by circuitry including the diode 77 and again there is presented, as indicated in curve I of Fig. 7, a negative going D.C. signal component of sufficient amplitude to control the operation of the repeller electrode of klystron 7 and carrying information sufficient to cause a tracking of the repeller voltage with the frequency sweeping of the cavity 8 and also including that information necessary to maintain the power level output substantially constant throughout the frequency range.

The power level control and the repeller voltage tracking is accomplished in this control system in substantially the same manner and following the same principle of operation as described with reference to Fig. 4. The mode recovery circuit 78 may be included as a component of the control circuit if switch 69 is closed and will function to maintain the operation of the klystron on the proper operating mode in substantially the same manner as described in connection with circuit 53 of Fig. 4.

The pulse output of modulator 73 should be such that the signal pulses have an extremely short rise and decay time to prevent frequency modulation of the output signal from the klystron. The cathode follower 79 couples the modulation signal, as depicted in curve E of Fig. 7, to the control grid of klystron 7 which functions to cut off beam current between square waves to prevent erratic operation which may tend to interrupt the desired klystron operation, and secondarily, tends to further eliminate frequency modulation of the klystron output signal.

While we have described above the principles of our invention in connection with specific apparatus, it is to be clearly understood that this description is made only by way of example and not as a limitation to the scope of our invention as set forth in the objects thereof and in the accompanying claims.

We claim:

1. A microwave sweep frequency generator comprising a microwave signal oscillator including means to sweep the frequency of the output signal of said oscillator through a given frequency range, means to couple a small portion of said output signal from the output of said oscillator for power level monitoring, and means including a bolometer to produce an error signal from said small portion of output signal according to variations in the power level thereof to control said oscillator for maintaining said output signal at a substantially constant power level as the frequency of said output signal is swept through said given frequency range.

2. A microwave sweep frequency generator comprising a reflex klystron oscillator having a cavity resonator, means coupled to said cavity resonator to sweep the frequency of output signal of said reflex klystron oscillator through a given frequency range, means coupled to the output of said reflex klystron oscillator to remove a small portion of the output signal therefrom for monitoring purposes, power detector means including a bolometer coupled to said last mentioned means to detect power level variations of the output signal of said reflex klystron oscillator and to produce an error signal from said small portion proportional to said power level variations, a control means responsive to said error signal to produce a control signal, and means to couple said control signal to said reflex klystron oscillator to maintain the output signal therefrom at a substantially constant power level as the frequency of said output signal is swept through said given frequency range.

3. A microwave sweep frequency generator comprising a source of microwave frequency signals, means coupled to said source to sweep the frequency of said signals through a given frequency range, a power divider coupled to the output of said source to remove a small portion of said signals from the output of said source for monitoring purposes, a power detector including a bolometer coupled to said power divider to detect power level variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, and means to couple said control signal to said source of frequency signals to maintain the output signal therefrom at a substantially constant power level as the frequency of said signals is swept through said given frequency range.

4. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a first source of direct current voltage having a negative value with respect to ground, means to couple the voltage of said first source to said cathode and said control electrode, a second source of direct current voltage having a negative value with respect to the voltage of said first source, a variable resistance network to couple the voltage of said second source to said repeller electrode, an output circuit coupled to said cavity resonator for removal of said output signal therefrom, said output circuit including a signal attenuating means, means coupled to said tuning means to sweep the frequency of said output signal through a given frequency range, a power divider coupled to said attenuating means to remove a small portion of said output signals from said output circuit for monitoring purposes, a power detector including a bolometer coupled to said power divider to detect power level variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, and means to couple said control signal to said attenuating means to alter the attenuation characteristics thereof to maintain said output signal at a substantially constant power level as the frequency thereof is swept through said given frequency range.

5. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a first source of direct current voltage having a negative value with respect to ground, means to couple the voltage of said first source to said cathode and said control electrode, a second source of direct current voltage having a negative value with respect to the voltage of said first source, a variable resistance network to couple the voltage of said second source to said repeller electrode, an output circuit coupled to said cavity resonator for removal of said output signal therefrom, said output circuit including a gas discharge device having a cathode and an anode, means coupled to the cathode and the anode of said gas discharge device to cause a gaseous discharge current therebetween, the amount of said discharge current controlling the amount of power of said output signal passing through said gas discharge device, means coupled to said tuning means to sweep the frequency of said output signal through a given frequency range, a power divider coupled to said gas discharge device to remove a small portion of said output signal from said output circuit for monitoring purposes, a power detector including a bolometer coupled to said power divider to detect power level variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, and means to couple said control signal in a series relationship with the cathode and anode of said gas discharge device to vary the discharge current thereof to maintain said output signal at a substantially constant power level as the frequency thereof is swept through said given frequency range.

6. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a first source of direct current voltage having a negative value with respect to ground, means to couple the voltage of said first source to said cathode, a second source of direct current voltage having a negative value with respect to the voltage of said first source, a variable resistance network to couple the voltage of said second source to said repeller electrode, an output circuit coupled to said cavity resonator for removal of said output signal therefrom, means coupled to said tuning means to sweep the frequency of said output signal through a given frequency range, a power divider coupled to said output circuit to remove a small portion of said output signals from said output circuit for monitoring purposes, a power detector including a bolometer coupled to said power divider to detect power level variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, and means to couple said control voltage to the control electrode of said oscillator to control the operations thereof to maintain said output signal at a substantially constant power level as the frequency thereof is swept through said given frequency range.

7. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a first source of direct current voltage having a negative value with respect to ground, means to couple the voltage of said first source to said cathode, a second source of direct current voltage having a negative value with respect to the voltage of said first source, means coupled to said tuning means to sweep the frequency of said output signal through a given frequency range, a power divider coupled to the output of said oscillator to remove a small portion of said output signal therefrom for monitoring purposes, a power detector including a bolometer coupled to said power divider to detect power level variations in the output signal of said oscillator and to produce an amplitude modulated audio frequency signal from said small portion, said amplitude modulation being proportional to said power level variations, a control circuit responsive to said amplitude modulation to produce therefrom a direct current control signal having an amplitude variation proportional to said amplitude modulation, means to couple said second source of direct current voltage to the output of said control circuit for adjustment thereof in accordance with the variations of said control signal, and means to couple the adjusted voltage of said second source to said repeller electrode to maintain said output signal at a substantially constant power level as the frequency thereof is swept through said given frequency range.

8. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a first source of direct current voltage having a negative value with respect to ground, means to couple the voltage of said first source to said cathode and said control electrode, a second source of direct current voltage having a negative value with respect to the voltage of said first source, a variable resistance network to couple the voltage of said second source to said repeller electrode, an output circuit coupled to said cavity resonator for removal of said output signal therefrom, said output circuit including a signal attenuating means, a motor, means coupling said motor to said tuning means and said variable resistance network for actuation by said motor of said tuning means to sweep the frequency of said output signal through a given frequency range and to vary the resistance of said variable resistance network to track the voltage applied to said repeller electrode with the tuning of said cavity resonator for desired operation of said oscillator, a power divider coupled to said attenuating means to remove a small portion of said output signals from said output circuit for monitoring purposes, a power detector including a bolometer coupled to said power divider to detect power level variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, and means to couple said control signal to said attenuating means to alter the attention characteristics thereof to maintain said output signal at a substantially constant power level as the frequency thereof is swept through said given frequency range.

9. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a first source of direct current voltage having a negative value with respect to ground, means to couple the voltage of said first source to said cathode and said control electrode, a second source of direct current voltage having a negative value with respect to the voltage of said first source, a variable resistance network to couple the voltage of said second source to said repeller electrode, an output circuit coupled to said cavity resonator for removal of said output signal therefrom, said output circuit including a gas discharge device having a cathode and an anode, means coupled to the cathode and the anode of said gas discharge device to cause a gaseous discharge current therebetween, the amount of said discharge current controlling the amount of power of said output signal passing through said gas discharge device, a motor, means coupling said motor to said tuning means and said variable resistance network for actuation by said motor of said tuning means to sweep the frequency of said output signal through a given frequency range and to vary the resistance of said variable resistance network to track the voltage applied to said repeller electrode with the tuning of said cavity resonator for desired operation of said oscillator, a power divider coupled to said gas discharge device to remove a small portion of said output signal from said output circuit for monitoring purposes, a power detector including a bolometer coupled to said power divider to detect power lever variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, and means to couple said control signal in a series relationship with the cathode and anode of said gas discharge device to vary the discharge current thereof to maintain said output signal at a substantially constant power level as the frequency thereof is swept through said given frequency range.

10. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a first source of direct current voltage having a negative value with respect to ground, means to couple the voltage of said first source to said cathode, a second source of direct current voltage having a negative value with respect to the voltage of said first source, a variable resistance network to couple the voltage of said second source to said repeller electrode, an output circuit coupled to said cavity resonator for removal of said output signal therefrom, a motor, means coupling said motor to said tuning means and said variable resistance network for actuation by said motor of said tuning means to sweep the frequency of said output signal through a given frequency range and to vary the resistance of said variable resistance network to track the voltage applied to said repeller electrode with the tuning of said cavity resonator for desired operation of said oscillator, a power divider coupled to said output circuit to remove a small portion of said output signals from said output circuit for monitoring purposes, a power detector including a bolometer coupled to said power divider to detect power level variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, and means to couple said control signal to the control electrode of said oscillator to control the operations thereof to maintain said output signal at a substantially constant power level as the frequency thereof is swept through said given frequency range.

11. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a first source of direct current voltage having a negative value with respect to ground, means to couple the voltage of said first source to said cathode and said control electrode, a second source of direct current voltage having a negative value with respect to the voltage of said first source, a variable resistance network to couple the voltage of said second source to said repeller electrode, an output circuit coupled to said cavity resonator for removal of said output signal therefrom, a motor, means coupling said motor to said tuning means and said variable resistance network to cause said tuning means to sweep the frequency of said output signal through a given frequency range and to change the resistance of said variable resistance to track the voltage applied to said repeller electrode with the tuning of said cavity resonator for desired operation of said oscillator in a given mode of operation, a power divider coupled to said output circuit to remove a small portion of said output signal from said output circuit for monitoring purposes, a power detector including a bolometer coupled to said power divider to detect power level variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, and means to couple said control signal to said repeller electrode to adjust the voltage of said second source in accordance with the variations of said control signal to compensate for power level variations in said output signal to provide a substantially constant power level as the frequency thereof is swept through said given frequency range.

12. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a first source of direct current voltage having a negative value with respect to ground, means to couple the voltage of said first source to said cathode and said control electrode, a second source of direct current voltage having a negative value with respect to the voltage of said first source, an output circuit coupled to said cavity resonator for removal of said output signal therefrom, a motor, means coupling said motor to said tuning means to cause said tuning means to sweep the frequency of said output signal through a given frequency range, a power divider coupled to said output circuit to remove a small portion of said output signal from said output circuit for monitoring purposes, a power detector including a bolometer coupled to said power divider to detect power level variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, means to couple said second source of direct current voltage to the output of said control circuit to adjust the voltage of said second source in accordance with the variations of said control signal, and means to couple the adjusted voltage of said second source to said repeller electrode to simultaneously track the voltage of said second source and to maintain the output signal of said oscillator at a substantially constant power level as the frequency of said signals is swept through said given frequency range.

13. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a source of direct current voltage having a negative value with respect to ground, means to couple the voltage of said direct current voltage source to said cathode and said control electrode, an output circuit coupled to said cavity resonator for removal of said output signal therefrom, a motor, means coupling said motor to said tuning means to cause said tuning means to sweep the frequency of said output signal through a given frequency range, a power divider coupled to said output circuit to remove a small portion of said output signal from said output circuit for monitoring purposes, a power detector coupled to said power divider to detect power level variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, means to couple the voltage of said direct current voltage source to said control circuit for combining with said direct current control signal to produce a complex control signal, and means to couple said complex control signal to said repeller electrode to simultaneously supply sufficient operating voltage to said repeller electrode, track said repeller electrode operating voltage with the tuning of said cavity resonator, and maintain the output signal of said oscillator at a substantially constant power level as the frequency of said signals is swept through said given frequency range.

14. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a source of direct current voltage having a negative value with respect to ground, means to couple the voltage of said direct current voltage source to said cathode and said control electrode, an output circuit coupled to said cavity resonator for removal of said output signal therefrom, a motor, means coupling said motor to said tuning means to cause said tuning means to sweep the frequency of said output signal through a given frequency range, a power divider coupled to said output circuit to remove a small portion of said output signal from said output circuit for monitoring purposes, a power detector coupled to said power divider to detect power level variations in the output signal of said source and to produce an amplitude modulated audio frequency error signal from said small portion, said amplitude modulation being proportional to said power level variations, a control circuit having a first portion responsive to said amplitude modulation to produce therefrom a direct current control signal having an amplitude variation proportional to said amplitude modulation, a second portion including a source of modulation signal and a third portion coupled to said direct circuit voltage source, said first portion and said second portion to combine the respective outputs thereof to provide a complex control signal, and means to couple said complex control signal to said repeller electrode to simultaneously supply sufficient operating voltage to said repeller electrode, track said repeller electrode operating voltage with the tuning of said cavity resonator, modulate the output signal of said oscillator in accordance with the modulation signal of said modulation source, and maintain the output signal of said oscillator at a substantially constant power level as the frequency of said signals is swept through said given frequency range.

15. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a first source of direct current voltage having a negative value with respect to ground, means to couple the voltage of said first source to said cathode and said control electrode, a second source of direct current voltage having a negative value with respect to the voltage of said first source, an output circuit coupled to said cavity resonator for removal of said output signal therefrom, a motor, means coupled from said motor to said tuning means to cause said tuning means to sweep the frequency of said output signal through a given frequency range, a power divider coupled to said output circuit to remove a small portion of said output signal from said output circuit for monitoring purposes, a power detector including bolometer coupled to said power divider to detect power level variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, means to couple said second source of direct current voltage to the output of said control circuit to adjust the voltage of said second source in accordance with the variations of said control signal, means to couple the adjusted voltage of said second source to said repeller electrode to simultaneously track the voltage of said second source with the tuning of said cavity resonator for operation of said oscillator in a given mode and to maintain the output signal of said oscillator at a substantially constant power level as the frequency of said signals is swept through said given frequency range, and a normally inoperative sawtooth generator connected in said control circuit to monitor the level of said direct current control signal, said sawtooth generator being made operative when said direct current control signal exceeds a given level, said given level being indicative of said oscillator operating on a mode other than said given mode, the sawtooth output of said generator sweeping the repeller electrode voltage until said oscillator again operates on said given mode.

16. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a source of direct current voltage having a negative value with respect to ground, means to couple the voltage of said direct current voltage source to said cathode and said control electrode, an output circuit coupled to said cavity resonator for removal of said output signal therefrom, a motor, means coupling said motor to said tuning means to cause said tuning means to sweep the frequency of said output signal through a given frequency range, a power divider coupled to said output circuit to remove a small portion of said output signal from said output circuit for monitoring purposes, a power detector coupled to said power divider to detect power level variations in the output signal of said source and to produce an amplitude modulated audio frequency error signal from said small portion, said amplitude modulation being proportional to said power level variations, a control circuit responsive to said amplitude modulation to produce therefrom a direct current control signal having an amplitude variation proportional to said amplitude modulation, means to couple the voltage of said direct current voltage source to said control circuit for combining with said direct current control signal to produce a complex control signal, means to couple said complex control signal to said repeller electrode to simultaneously supply sufficient operating voltage to said repeller electrode, track said repeller electrode operating voltage with the tuning of said cavity resonator for operation of said oscillator in a given mode, and maintain the output signal of said oscillator at a substantially constant power level as the frequency of said signals is swept through said given frequency range, and a normally inoperative sawtooth generator connected in said control circuit to monitor the level of said direct current control signal, said sawtooth generator being made operative when said direct current control signal exceeds a given level, said given level being indicative of said oscillator operating on a mode other than said given mode, the sawtooth output of said generator sweeping the repeller electrode voltage until said oscillator again operates on said given mode.

17. A microwave sweep frequency generator comprising a reflex klystron oscillator having a cavity resonator and at least a cathode, a repeller electrode and a control electrode, a tuning means integral with said cavity resonator to change the frequency of the output signal of said oscillator, a source of direct current voltage having a negative value with respect to ground, means to couple the voltage of said direct current voltage source to said cathode and said control electrode, an output circuit coupled to said cavity resonator for removal of said output signal therefrom, a motor, means coupling said motor to said tuning means to cause said tuning means to sweep the frequency of said output signal through a given frequency range, a power divider coupled to said output circuit to remove a small portion of said output signal from said output circuit for monitoring purposes, a power detector coupled to said power divider to detect power level variations in the output signal of said source and to produce an amplitude modulated audio frequency error signal from said small portion, said amplitude modulation being proportional to said power level variations, a control circuit having a first portion responsive to said amplitude modulation to produce therefrom a direct current control signal having an amplitude variation proportional to said amplitude modulation, a second portion including a source of modulation signal and a third portion coupled to said direct circuit voltage source, said first portion and said second portion to combine the respective outputs thereof to provide a complex control signal, means to couple said complex control signal to said repeller electrode to simultaneously supply sufficient operating voltage to said repeller electrode, track said repeller electrode operating voltage with the tuning of said cavity resonator for operation of said oscillator in a given mode, modulate the output signal of said oscillator in accordance with the modulation signal of said modulation source, and maintain the output signal of said oscillator at a substantially constant power level as the frequency of said signals is swept through said given frequency range, and a normally inoperative sawtooth generator connected in said control circuit to monitor the level of said direct current control signal, said sawtooth generator being made operative when said direct current control signal exceeds a given level, said given level being indicative of said oscillator operating on a mode other than said given mode, the sawtooth output of said generator sweeping the repeller electrode voltage until said oscillator again operates on said given mode.

References Cited in the file of this patent

UNITED STATES PATENTS

| | | |
|---|---|---|
| 2,434,294 | Ginzton | Jan. 13, 1948 |
| 2,686,878 | Walker | Aug. 17, 1954 |
| 2,785,309 | Chelgren | Mar. 12, 1957 |
| 2,793,292 | Wolff | May 21, 1957 |